March 11, 1941.   A. NICOLE   2,234,314
CENTRIFUGAL GOVERNOR
Filed April 20, 1939
Fig. 1
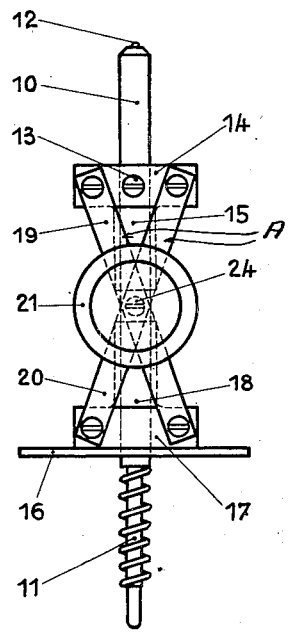
Fig. 3
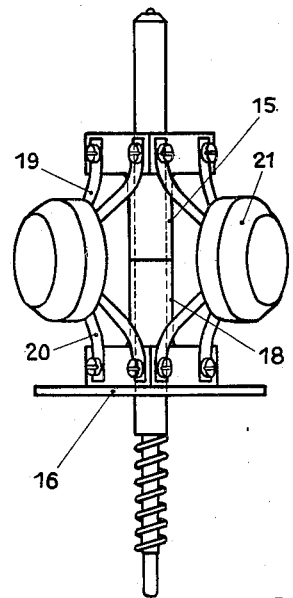
Fig. 4
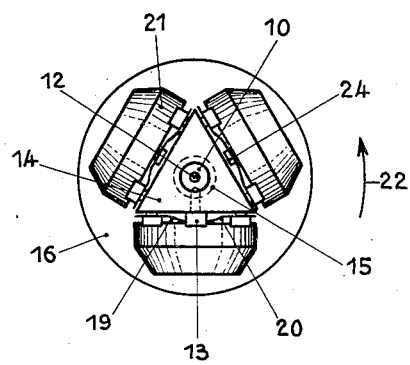
Fig. 5
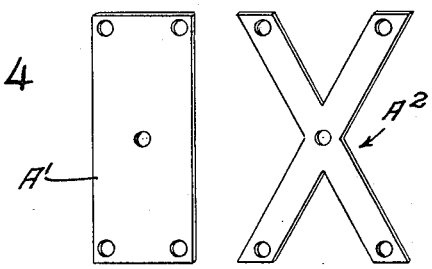
Fig. 2
INVENTOR
AMÉDÉE NICOLE
By Wilkinson & Graff
Attys.

Patented Mar. 11, 1941

2,234,314

UNITED STATES PATENT OFFICE 2,234,314

CENTRIFUGAL GOVERNOR

Amédée Nicole, Saint-Croix, Switzerland, assignor to Paillard et Cie S. A., Sainte-Croix, Switzerland, a corporation of Switzerland Application April 20, 1939, Serial No. 269,028
In Switzerland April 22, 1938

8 Claims. (Cl. 264—18)

The present invention has for its subject a centrifugal governor provided with a transverse braking plate sliding on a rotary shaft and of which the axial and angular movements are controlled by springs secured to the shaft and subjected to the action of balls or other weights subjected to centrifugal force.

Governors of this character are in general use for example for regulating the speed of phonograph motors. In order to enable governors of this type to be used it is necessary for them to be very sensitive and in order to respond to this requirement it is necessary for them to operate with the minimum of friction. This is now the case of governors of the most well known type wherein the springs supporting the centrifugal ball or weight are formed by simple blades. When these governors are applied for the regulation of the speed of spring motors they are placed in the mechanism ahead of the shaft carrying the plate turntable and operate in a satisfactory manner as the forces to which they are subjected are relatively low.

This however is not the case when they are required to effect the regulation of the speed of an electric motor as in such a case they are placed directly in engagement with the driving shaft and are subjected to considerable forces, up to ten times as high as in the preceding case. The action of the centrifugal balls carried on the springs tends to shear them as the speed of rotation increases, whereby the normal operation of the governor is impeded and whereby fracture of the springs is sometimes produced. As the section of the springs cannot be increased, for the purpose of strengthening them, without destroying the sensitiveness of the governor, it results that governors of the type described above cannot be used for regulating the speed of electric motors.

Endeavors have been made to impart to the governor the necessary rigidity, for example by means of hinged links adapted to relieve the spring blades, but all means of this character have the serious disadvantage of destroying the sensitiveness of the governor by reason of the friction which they set up.

The present invention has for its object to remedy this disadvantage by creating a governor which, while retaining the principle of simplicity of construction of the governors of the known type, and the sensitiveness of the springs carrying the centrifugal balls or weights, obviates the springs being subjected to the deleterious twisting action produced by the centrifugal balls. For this purpose each centrifugal ball is attached to a resilient support or spring blade of which the ends are connected respectively to the transverse braking plate, and to a collar fixedly secured to the rotary shaft, at points located on opposite sides of a central plane passing through the rotary shaft and the point of attaching the ball to the spring blade, in such a manner that the force applied to the plate is effected essentially by traction while eliminating the twisting forces which are deleterious to the operation of the governor.

The accompanying drawing shows by way of example one form of construction of the subject of the invention, wherein:

Fig. 1 is an elevation.

Fig. 2 is a plan.

Fig. 3 shows the deformation of the springs under the action of centrifugal force.

Figs. 4 and 5 are detail views of resilient members.

As shown in the figures the shaft 10 is provided at its lower end with a worm 11 and at its upper end with a pivoting terminal ball 12. To the shaft 10 there is secured, by means of a screw 13, a stationary collar member 14 of triangular shape provided with a sleeve 15. As shown, triangular member 14 is substantially perpendicular to shaft 10.

The transverse braking plate 16 is adapted to slide on the shaft 10, and is secured to a slidable rider member 17 of the same triangular shape as the triangular collar member 14 and is provided with a sleeve 18. The space between the ends of the two sleeves 15 and 18 corresponds with the maximum axial movement of the transverse plate 16 relatively to the triangular collar member 14.

To each of the three faces of the triangular members 14 and 17 are secured the ends of a resilient member A preferably consisting of two spring blades 19 and 20 having parallel edges and which cross one another as shown substantially midway of the length in such a manner as to form a St. Andrew's cross, the center of the cross serving as the securing point 24 for a centrifugal ball or weight 21.

The operation of this governor is as follows:

When the shaft 10 is driven, for example in the direction of the arrow 22 (Fig. 2) the centrifugal balls 21 tend to deform the resilient member comprising the spring blades 19 and 20 under the action of centrifugal force, as is shown in Fig. 3, which produces an axial movement of the transverse braking plate 16 towards the stationary triangular collar member 14 and braking plate 16 engages the fixed braking surface which it is adapted to contact.

When a braking action is thus applied to this transverse braking plate 16 the springs 19 and 20 are consequently subjected to a twisting force, which in known constructions prevents the normal operation of the governor by reason of the deformation of the blades, and this twisting force also produces in the course of time a deterioration of these blades. With a governor according to the present invention the said braking forces are essentially converted into a pulling force and a pressure on the springs respectively, which practically eliminate the twisting forces which are deleterious to the effective operation of the governor.

In this case the impulse or force against the plate is produced without any deleterious force on the springs, by a pulling force on each of the springs which produces a horizontal component which is tangential to a circle concentric with the axis of rotation.

It will be understood that the details of construction may differ from those shown in the drawing and described above.

In particular more than three centrifugal masses may be provided for each governor.

Instead of using spring blades crossed in the form of a St. Andrew's cross as the support for the centrifugal masses 21, only a single spring blade $A^1$ (Fig. 4) may be provided which is sufficiently wide so as to enable it to be secured at its ends at four points which are located in pairs on opposite sides of the plane passing through the rotary shaft and the point of securing the ball.

The St. Andrew's cross may also be obtained by being cut in a strip $A^2$ of sufficient width (Fig. 5).

The principal advantage of the supports for the centrifugal balls in the form of a St. Andrew's cross is to increase considerably the sensitivity of the flywheel for a given thickness of material without reducing the moment of inertia of the system.

I claim:

1. The combination comprising a spindle, a ball mounted at one end of said spindle, a triangular support secured to said spindle, a sleeve on said support, said sleeve embracing said spindle, a plate slidably mounted on said spindle, a worm on said spindle at the end thereof remote from said ball, a second triangular support secured to said plate, a sleeve on said second support and embracing said spindle, the sleeves on said supports being located on the faces of said supports turned towards one another, a plurality of pairs of spring blades, each pair of spring blades crossing one another and being secured at one end to one face of one triangular support and at the other end to a face of the other triangular support and a plurality of centrifugal masses secured one to the crossing point of each pair of spring blades, said sleeves serving to limit the approaching movement of said plate towards the first triangular support.

2. In a centrifugal governor, particularly for phonographs, a driving shaft, a fixed collar fixedly carried on said shaft, a slidable riding collar slidably carried on said shaft, a plurality of pairs of spring blades extending between said collars, the two blades constituting each pair crossing each other substantially midway of their length, and the respective ends of each blade being attached to points on said respective collars so positioned that said blade intersects obliquely the plane containing the axis of said shaft which passes through the point of intersection of the blades constituting a pair.

3. In a centrifugal governor, particularly for phonographs, a driving shaft, a fixed collar fixedly carried on said shaft, a slidable riding collar slidably carried on said shaft, a plurality of pairs of spring blades extending between said collars, each of said pairs being normally substantially positioned in a plane substantially parallel to the axis of said shaft, and each of said blades being attached to said respective collars at points on opposite sides of the plane containing the axis of said shaft which is perpendicular to the plane of said blades.

4. In a centrifugal governor, especially for phonographs, a driving shaft, a fixed triangular collar fixedly carried on said shaft, a slidable riding triangular collar slidably carried on said shaft, a plurality of pairs of spring blades extending between said collars, each blade of each pair being attached to points on corresponding triangular faces of said respective collars which points lie on opposite sides of the plane containing the axis of said shaft which passes through the midpoint of the respective triangular face, whereby the two blades constituting a pair intersect intermediate their length between said collars.

5. In a centrifugal governor, particularly for phonographs, a driving shaft, a fixed collar fixedly carried on said shaft, a slidable riding collar slidably carried on said shaft, a plurality of pairs of spring blades extending between said collars, the two blades constituting each pair crossing each other substantially midway of their length, and a centrifugal weight for each of said pairs attached to the two blades constituting each pair at their intersection, and the respective ends of each balde being attached to points on said respective collars so positioned that said blade intersects obliquely the plane containing the axis of said shaft which passes through the point of intersection of the blades constituting a pair.

6. In a centrifugal governor, particularly for phonographs, a driving shaft, a fixed collar fixedly carried on said shaft, a slidable riding collar slidably carried on said shaft, a plurality of pairs of spring blades extending between said collars, the two blades constituting each pair crossing each other intermediate of their length, and the respective ends of each blade being attached to points on said respective collars lying on opposite sides of the plane containing the axis of said shaft which passes through the point of intersection of said blades.

7. In a centrifugal governor, particularly for phonographs, a driving shaft, a fixed collar fixedly carried on said shaft, a slidable riding collar slidably carried on said shaft, and a resilient member formed by a pair of spring blades arranged in the form of a St. Andrew's cross extending between and having its respective ends secured to said collars respectively.

8. A governor according to claim 7, and a centrifugal weight attached to said resilient member at the crossing point of said St. Andrew's cross.

AMÉDÉE NICOLE.